(12) United States Patent
Shin

(10) Patent No.: US 6,843,570 B2
(45) Date of Patent: Jan. 18, 2005

(54) MICRO MIRROR DEVICE AND PROJECTOR EMPLOYING THE SAME

(75) Inventor: Hyung-jae Shin, Seongnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 84 days.

(21) Appl. No.: 10/259,562

(22) Filed: Sep. 30, 2002

(65) Prior Publication Data

US 2003/0067590 A1 Apr. 10, 2003

(30) Foreign Application Priority Data

Oct. 9, 2001 (KR) .......................................... 2001-62078

(51) Int. Cl.$^7$ ............................................... G03B 21/28
(52) U.S. Cl. ............................. 353/99; 353/37; 353/73; 348/771; 345/84; 359/292
(58) Field of Search ........................ 353/37, 73, 98–99; 348/742–743, 771; 359/291–292; 345/84

(56) References Cited

U.S. PATENT DOCUMENTS

| | | | | |
|---|---|---|---|---|
| 5,754,217 A | * | 5/1998 | Allen | .......................... 347/239 |
| 6,031,657 A | | 2/2000 | Robinson et al. | |
| 6,457,833 B1 | * | 10/2002 | Ishikawa et al. | ............... 353/99 |
| 6,523,961 B2 | * | 2/2003 | Ilkov et al. | .................... 353/99 |

* cited by examiner

Primary Examiner—Russell Adams
Assistant Examiner—Michael Dalakis
(74) Attorney, Agent, or Firm—Sughrue Mion, PLLC

(57) ABSTRACT

Provided are a micro mirror device capable of realizing color images without a color wheel by selectively reflecting color beams using a plurality of micro mirrors whose driving axes are positioned in different directions, and a projector employing the same. The micro mirror device can individually control a plurality of micro mirrors, the micro mirror device comprising a plurality of micro mirror units having micro mirrors whose driving axes are positioned at predetermined different angles, the micro mirror units for reflecting light incident in different directions. Also, the projector includes a light source for illuminating light; a light separation unit for separating light generated by the light source into several beams according to wavelength regions, and for reflecting or projecting the beams at different angles; a micro mirror device including a plurality of micro mirror units which are composed of a plurality of micro mirrors whose driving axes are respectively positioned at different predetermined angles, the micro mirror device for realizing an image by selectively reflecting the beams, which are passing through the light separation unit, in a predetermined direction and at a predetermined angle; and a projection lens unit for magnifying and projecting light generated by the micro mirror device toward a screen.

9 Claims, 6 Drawing Sheets

MICRO MIRROR DEVICE AND PROJECTOR EMPLOYING THE SAME

BACKGROUND OF THE INVENTION

This application claims the priority of Korean Patent Application No. 2001-62078, filed Oct. 9, 2001 in the Korean Intellectual Property Office, which is incorporated herein in its entirety by reference.

1. Field of the Invention

The present invention relates to a micro mirror device for changing the reflection path of light by actuating a micro mirror, and a projector employing the same, and more particularly, to a micro mirror device capable of realizing color images without a color wheel by selectively reflecting color beams using a plurality of micro mirrors whose driving axes are positioned at different angles, and a projector employing the same.

2. Description of the Related Art

In general, a micro mirror device includes a plurality of micro mirrors actuated by electrostatic attraction, and changes the reflection path of light by changing the reflection angle of light according to the angle or direction of each inclined micro mirror. Such a micro mirror device can be applied to an image display of a projection television, a scanner, a copy machine or a facsimile. In particular, when used for an image display, the micro mirror device produces an image by two dimensionally arranging as many micro mirrors as the number of pixels, actuating each micro mirror individually in response to an image signal for each pixel, and determining the reflection angle of incident light.

Referring to FIG. 1, a conventional micro mirror device 115 includes a plurality of micro mirrors 100 that are arranged two dimensionally, and whose driving axes Y are positioned in the same direction. The micro mirrors 100 are actuated with regard to the driving axes Y to be switched on or off, and selectively reflect beams incident upon them.

FIG. 2 is a view of a projector employing a conventional micro mirror device as illustrated in FIG. 1. Referring to FIG. 2, a beam is emitted from a light source 120, focused by a first condenser 122, and incident upon a color wheel 125. Here, a color image is realized by rotating the color wheel 125 at high speed to sequentially illuminate beams of three colors, i.e., R(red), G(green), B(blue), on the single plate micro mirror device 115. The beam, which passed through the color wheel 125, is incident upon the micro mirror device 115 having as many micro mirrors 100 as the number of pixels via a second condenser 127. When the micro mirror device 115 is actuated in response to image signals for each pixel, each micro mirror 100 is inclined at a predetermined angle. Then color beams corresponding to pixels are reflected at proper angles, and travel toward a projection lens unit 133. Next, the beams are magnified by the projection lens unit 133, and the magnified image form on a screen 135.

Here, the micro mirror 100 is switched on or off to selectively reflect R, G, B beams which are sequentially transmitted from the color wheel 125. At this time, since the driving axes Y of the micro mirrors 100 head toward the same direction, the micro mirrors 100 are switched on or off to sequentially reflect R, G, B beams in the same direction or at the same angle.

However, because the color wheel 125 rotates at high speed, it makes noise and is not actuated stably. Further, due to the mechanical limitation of the color wheel 125, the color wheel 125 does not rotate beyond a predetermined speed, which would cause color breakup. Also, light may be lost at the filter borders of the color wheel 125, and therefore, light must be concentrated to have a very small beam size so as to prevent this problem. However, there is a limitation in reducing light to beam size. Thus it is inevitable that light escapes at the borders. In addition, the color wheel 125 is very expensive, thereby increasing manufacturing cost.

SUMMARY OF THE INVENTION

To solve the above and related problems, it is a first object of the present invention to provide a micro mirror device capable of making up unit pixels using micro mirrors whose driving axes are differently positioned, and realizing color images without a color wheel, and a projector employing such a micro mirror device.

To achieve an aspect of the above object, there is provided a micro mirror device capable of individually controlling a plurality of micro mirrors, the micro mirror device including a plurality of micro mirror units having micro mirrors whose driving axes are positioned at predetermined different angles, the micro mirror units for reflecting light incident in different directions.

Each of the micro mirror units includes a plurality of micro mirrors whose driving axes are positioned at 120 degree from one another.

The micro mirrors are respectively symmetrical with respect to the driving axes and diamond shaped.

Also, the micro mirror units can secure the reflection area of incident light to align the micro mirror units very closely to one another.

To achieve another aspect of the above object, there is provided a projector including a light source for illuminating light; a light separation unit for separating light generated by the light source into several beams according to wavelength regions, and for reflecting or projecting the beams at different angles; a micro mirror device including a plurality of micro mirror units which are composed of a plurality of micro mirrors whose driving axes are respectively positioned at different predetermined angles, the micro mirror device for realizing an image by selectively reflecting the beams, which are passing through the light separation unit, in a predetermined direction and at a predetermined angle; and a projection lens unit for magnifying and projecting light generated by the micro mirror device toward a screen.

BRIEF DESCRIPTION OF THE DRAWINGS

The above object and advantages of the present invention will become more apparent by describing in detail a preferred embodiment thereof with reference to the attached drawings in which.

DETAILED DESCRIPTION OF THE INVENTION

Figure 1:
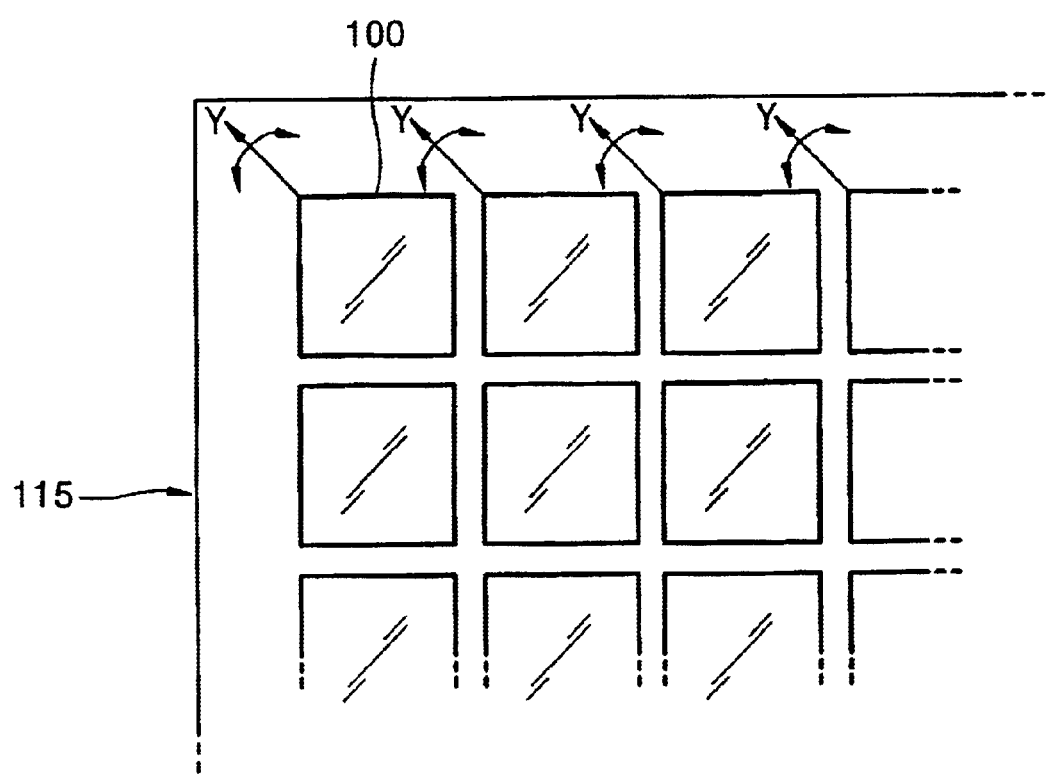
FIG. 1 is a schematic view of a conventional micro mirror device.
Figure 2:
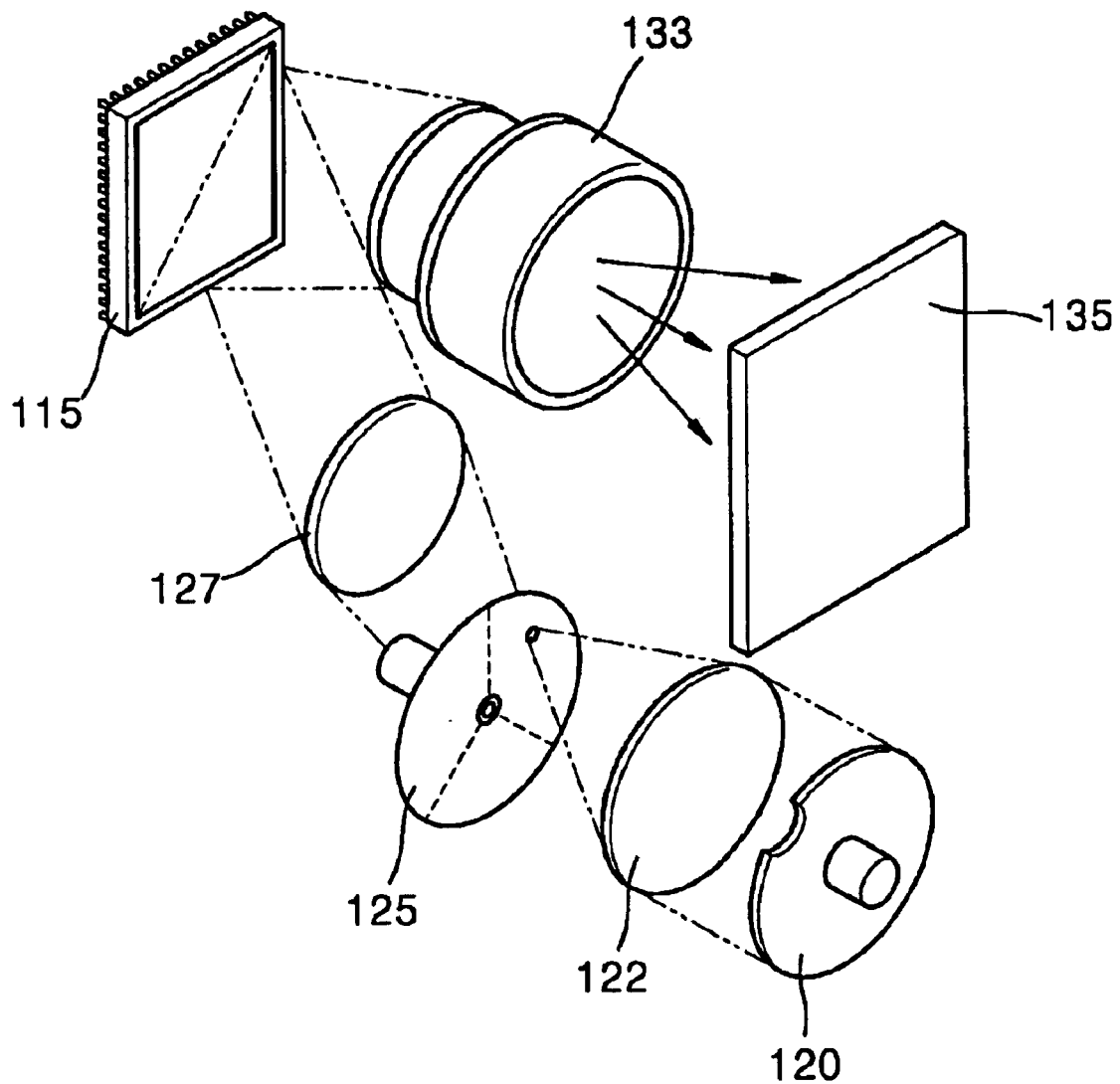
FIG. 2 is a schematic view of the structure of a projector employing the micro mirror device of FIG. 1.
Figure 3:
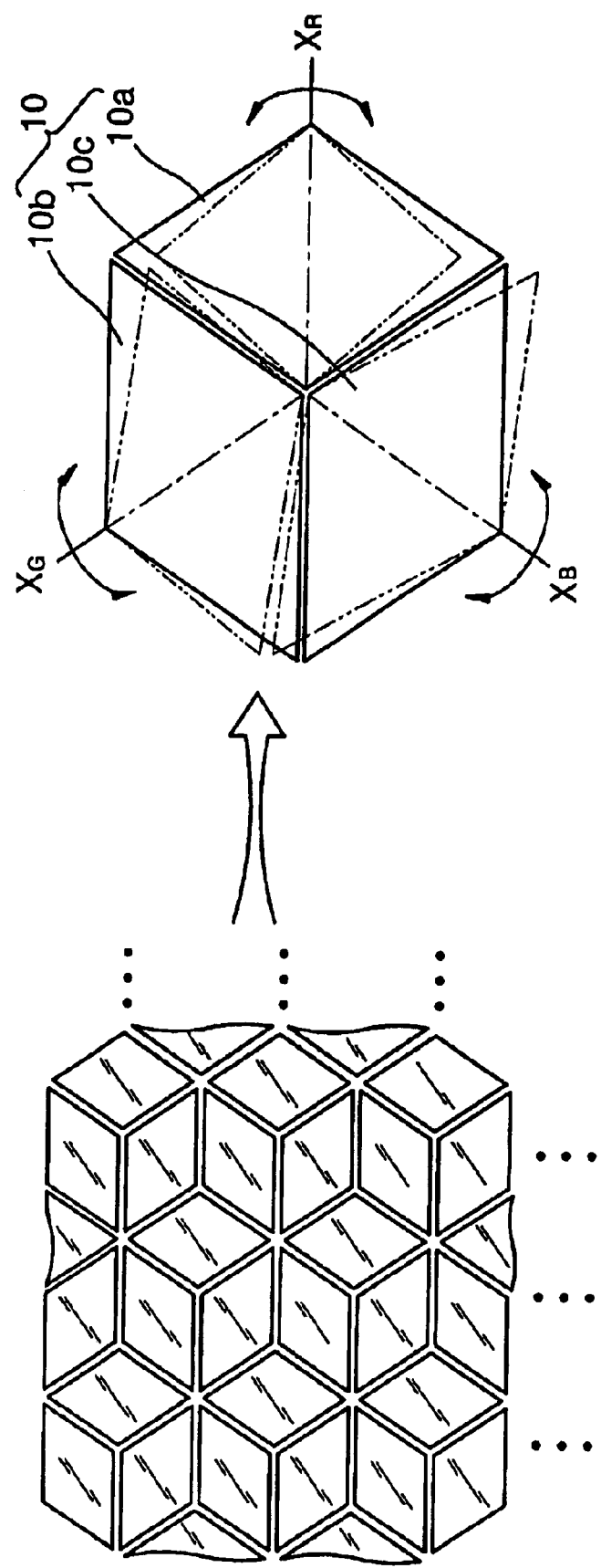
FIG. 3 is a view of the arrangement of micro mirrors constituting a micro mirror device according to the present invention, and an enlarged view of a micro mirror.

Referring to FIG. 3, a micro mirror device according to a preferred embodiment of the present invention includes a plurality of micro mirror units 10 that are each composed of a plurality of micro mirrors whose driving axes are positioned at different angles. The driving axes of the plurality of micro mirrors constituting the micro mirror unit 10 are positioned in different directions, and thus, the direction of beams, which are output from the micro mirror unit 10, become different from one another when each micro mirror slants with regard to these driving axes. The micro mirror units 10 includes, for instance, first through third micro mirrors 10a through 10c whose first through third driving axes $X_R$, $X_G$, and $X_B$ are positioned by 120 degree from one another.

Preferably, the first through third micro mirrors 10a through 10c are symmetrical with regard to each of the driving axes $X_R$, $X_G$, $X_B$, and positioned very closely to neighboring micro mirrors so as to secure the maximum reflection area of light incident upon them in consideration of the optical efficiency. To meet this requirement, preferably, the micro mirrors 10a through 10c are diamond shaped, and may be arranged to make the entire outline of the micro mirror unit 10 hexagonal shaped. Also, the first through third micro mirrors 10a through 10c can rotate in different directions with regard to the first through third driving axes $X_R$, $X_G$, $X_B$, respectively. Due to this structure, the first through third micro mirrors 10a through 10c can move without bumping into neighboring micro mirrors.

Figure 4:
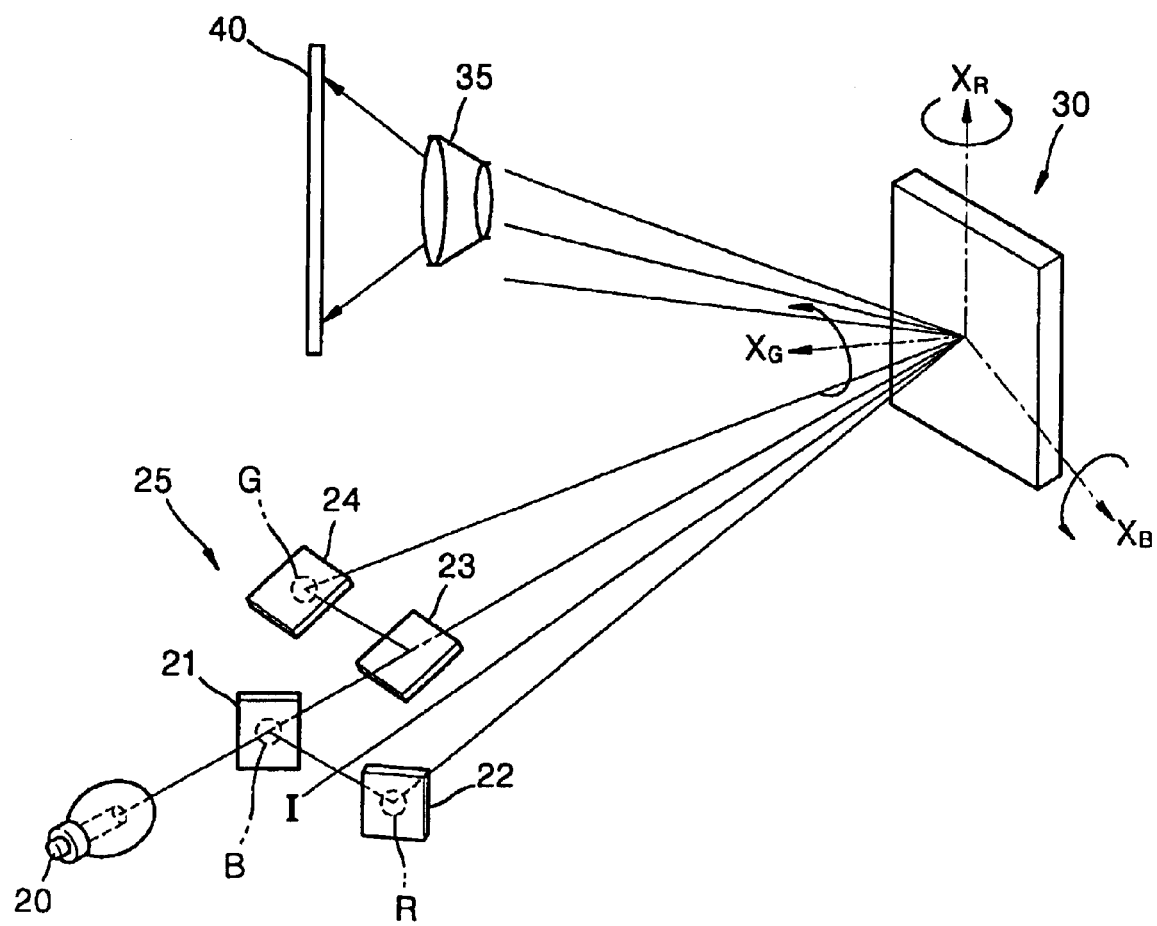
FIG. 4 is a schematic view of the structure of a projector employing a micro mirror device according to the present invention.

Referring to FIG. 4, a projector employing such a micro mirror device according to the present invention includes a light source 20; a light separation unit 25 for separating light output from the light source 20 according to wavelength regions into several beams, and reflecting or projecting the beams at different angles; a micro mirror device 30 for selectively reflecting the beams, which are to be incident in the different directions according to the wavelength regions, in predetermined directions or at predetermined angles; and a projection lens unit 35 for magnifying and projecting the beams output from the micro mirror device 30 toward a screen 40.

The light separation unit 25 separates light output from the light source 20 into beams of three colors, i.e., R(red), G(green), B(blue) beams, according to wavelength regions, and includes first and second dichroic mirrors 21 and 23, and first and second total reflection mirrors 22 and 24. For instance, the first dichroic mirror 21 may be a dichroic mirror for reflecting the R beam, and reflects a beam belonging to a red wavelength region, i.e., the R beam, on the first total reflection mirror 22, but transmits lights belonging to the G and B wavelength regions. Similarly, the second dichroic mirror 23 may be, for example, a dichroic mirror for reflecting the G beam, reflects the G beam on the second total reflection mirror 24, and transmits the B beam when the G and B beams, which transmitted from the first dichroic mirror 21, are incident on the second dichroic mirror 23.

Therefore, the R, G, B beams are incident upon the micro mirror device 30 at different angles by the first total reflection mirror 22, the second total reflection mirror 24, and the second dichroic mirror 23, respectively. As a result, the R, G, B beams are selectively incident upon the projection lens unit 35 according to the different incident angles of the R, G, B beams, and the directions along which the micro mirror 10 is actuated, corresponding to these incident angles.

As previously mentioned, the micro mirror device 30 has a plurality of micro mirror units 10 that are each composed of the first through third micro mirrors 10a through 10c whose first through third driving axes $X_R$, $X_G$ and $X_B$ are positioned by different predetermined angles, respectively.

In the event that the first through third micro mirrors 10a through 10b whose first through third driving axes $X_R$, $X_G$, $X_B$ are positioned, for example, by 120 degree, the directions along which the first through third micro mirrors 10a through 10c are actuated become different from one another. As a result, the directions that light incident upon the micro mirrors is reflected are not the same.

Figure 5:
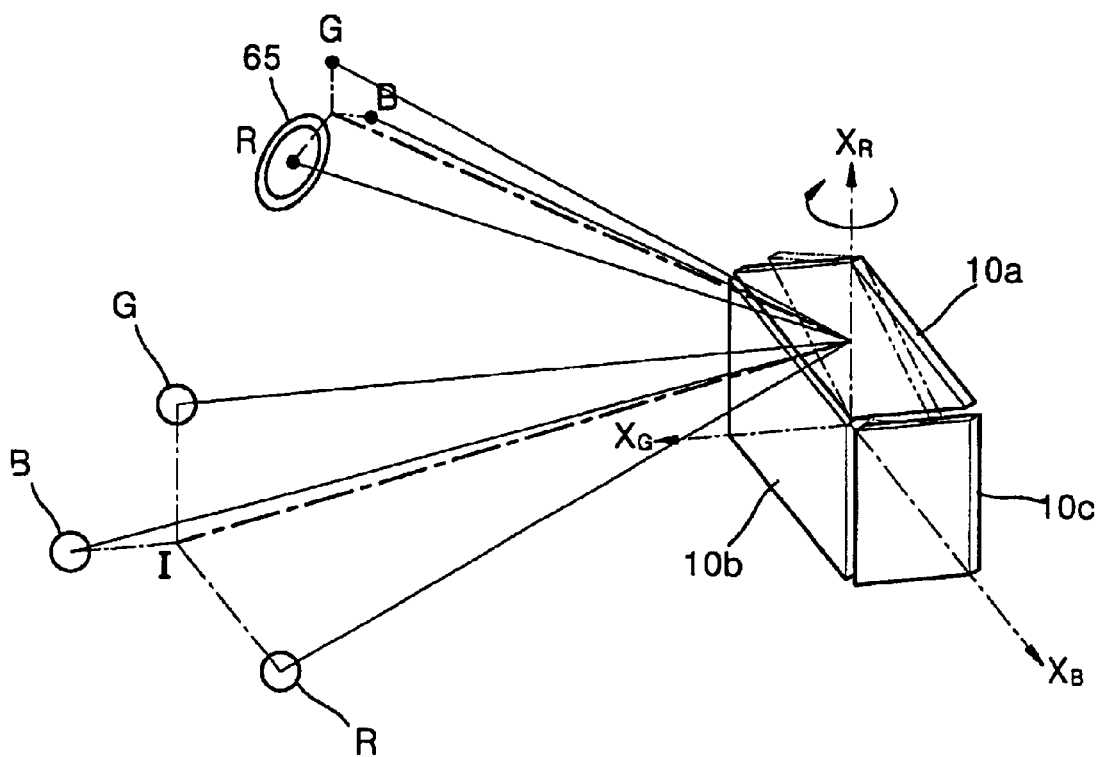
FIGS. 5 and 6 are views for explaining the operations of a projector employing a micro mirror device according to the present invention.
Figure 6:
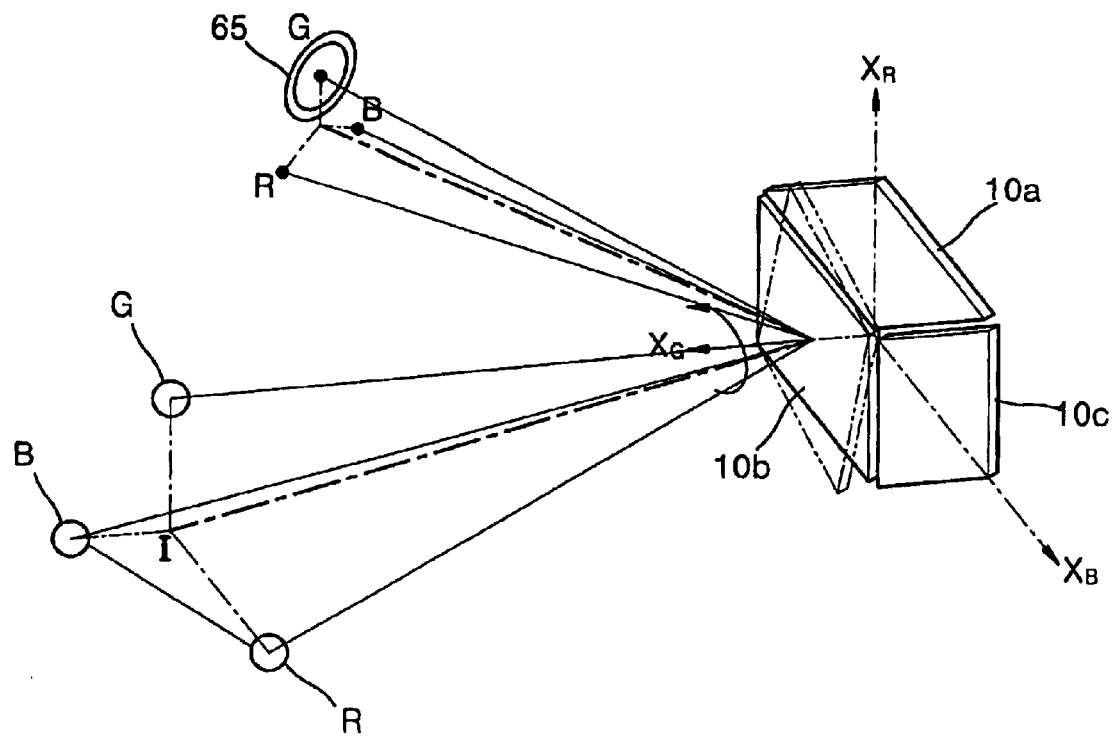

FIGS. 5 and 6 are views for explaining the operations of a projector that employs a micro mirror device according to the present invention, i.e., realizing color images. Here, R, G, and B denote the directions of beams of three colors, i.e., R, G, B, that are incident upon the micro mirror device 30 of FIG. 4 including the first through third micro mirrors 10a through 10c.

As shown in FIG. 5, when R, G, B beams separate from the light separation unit 25 and then are incident upon the micro mirror device 30 at different angles, the R, G, B beams are reflected in different directions if the first micro mirror 10a moves counterclockwise with regard to the first driving axis $X_R$. At this time, it is possible to selectively move one of the R, G, B beams, which are incident upon the first micro mirror 10a, toward the projection lens unit 35 of FIG. 4. For instance, only the R beam may travel toward the projection lens unit 35, and the G and B beams may be projected out of the projection lens unit 35. Also, if the first micro mirror 10a slants clockwise with regard to the first driving axis $X_R$, all of the R, G, and B beams are projected out of the projection lens unit 35.

Based on the above principle, if the second micro mirror 10b moves counterclockwise with regard to the second driving axis $X_G$ as shown in FIG. 6, only the G beam, for example, travels toward the projection lens unit 35, and the R and B beams are projected out of the projection lens unit 35. Also, the second micro mirror 10b moves clockwise with regard to the second driving axis $X_G$, the R, G, B beams are projected out of the projection lens unit 35. Similarly, the B beam can selectively travel toward the projection lens unit 35 by moving the third micro mirror 10c. Therefore, it is possible to realize a color image by assigning the micro mirror unit 10 to one pixel.

Accordingly, with a micro mirror device and a projector employing the same, according to the present invention, it is possible to selectively transmit the R, G, B beams toward the projection lens unit 35 at once by reflecting them at different angles, using the micro mirror unit 10 in which the first through third micro mirrors 10a through 10c whose driving axes $X_R$, $X_G$, $X_B$ are positioned at different angles, respectively. Thus color filter means such as a color wheel are not required in the present invention.

While the present invention has been particularly shown and described with reference to a preferred embodiment thereof, it will be understood by those skilled in the art that various changes in form and details may be made therein without departing from the spirit and scope of the invention as defined by the appended claims.

As described above, in a micro mirror device and a projector employing the same, according to the present invention, color images can be realized without a color wheel by selectively reflecting R, G, and B beams at once, using a micro mirror unit composed of a plurality of micro mirrors including a plurality of micro mirrors whose driving axes are positioned at different angles. Thus, it is possible to prevent mechanical noise or vibration due to the rotation of the color wheel at high speed, and actuate in a stable manner the above micro mirror device and the projector.

In addition, the very expensive color wheel is not required, thereby reducing manufacturing cost and power consumption. Thus, the above micro mirror device and the projector can be adopted in portable devices. Also, in the past, it was very inconvenient and difficult to realize R, G, and B beams with one micro mirror, whereas now, R, G, and B beams can be realized with a plurality of micro mirrors at once according to the present invention. Thus, the actuating number of micro mirrors can be reduced, thereby increasing the lifetime of the micro mirror device. Further, the complete use of light output from a light source increases the luminous efficiency of the micro mirror device and the projector according to the present invention.

What is claimed is:

1. A micro mirror device capable of individually controlling a plurality of micro mirrors, the micro mirror device comprising a plurality of micro mirror units having micro mirrors whose driving axes are positioned at predetermined different angles, the micro mirror units for reflecting light incident in different directions, wherein the micro mirrors are respectively symmetrical with respect to the driving axes, wherein the micro mirrors are diamond shaped, and wherein each micro mirror unit corresponds to a single pixel of the image and has a hexagonal shape.

2. The micro mirror device of claim 1, wherein each of the micro mirror units comprises a plurality of micro mirrors whose driving axes are positioned at 120 degree from one another.

3. The micro mirror device of claim 1, wherein the micro mirror units can secure the reflection area of incident light to align the micro mirror units very closely to one another.

4. A projector comprising:

a light source for illuminating light;

a light separation unit for separating light generated by the light source into several beams according to wavelength regions, and for reflecting or projecting the beams at different angles;

a micro mirror device including a plurality of micro mirror units which are composed of a plurality of micro mirrors whose driving axes are respectively positioned at different predetermined angles, the micro mirror device for realizing an image by selectively reflecting the beams, which are passing through the light separation unit, in a predetermined direction and at a predetermined angle, wherein each micro mirror unit corresponds to a single pixel of the image and has a hexagonal shape; and a projection lens unit for magnifying and projecting light generated by the micro mirror device toward a screen.

5. The micro mirror device of claim 4, wherein the driving axes of the micro mirrors are positioned at 120 degree from one another.

6. The projector of claim 5, wherein the micro mirrors are respectively symmetrical with respect to the driving axes.

7. The projector of claim 6, wherein the micro mirrors are diamond shaped.

8. The projector of claim 7, wherein the micro mirror unit can secure the reflection area of incident light to align the micro mirrors very closely to one another.

9. The projector of claim 4, wherein the micro mirrors are respectively symmetrical with respect to the driving axes.

* * * * *